July 22, 1969     D. B. SHAFFER ET AL     3,456,848
WASHING AND WAXING CART FOR VEHICLES
Filed May 14, 1968     2 Sheets-Sheet 1
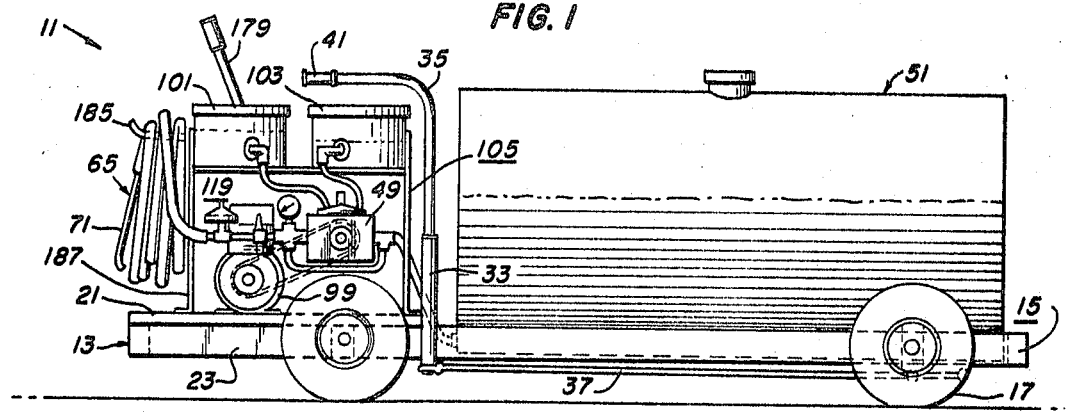
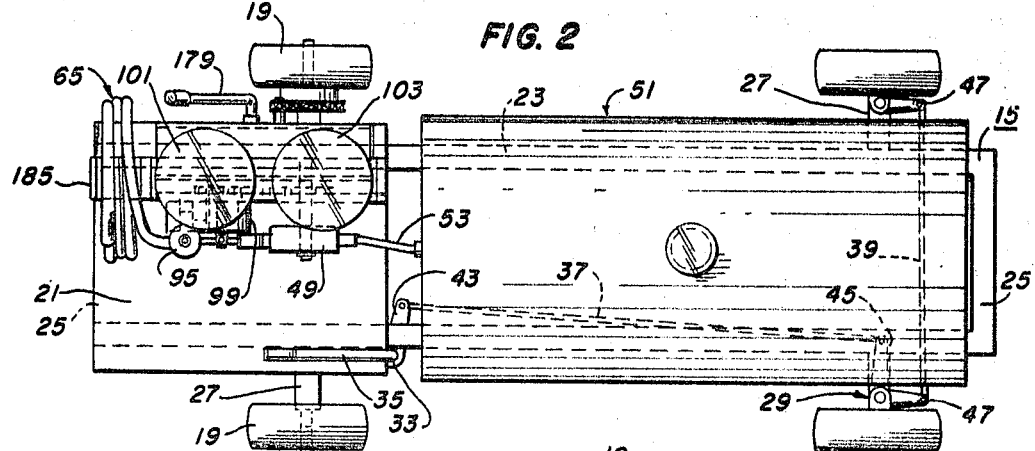
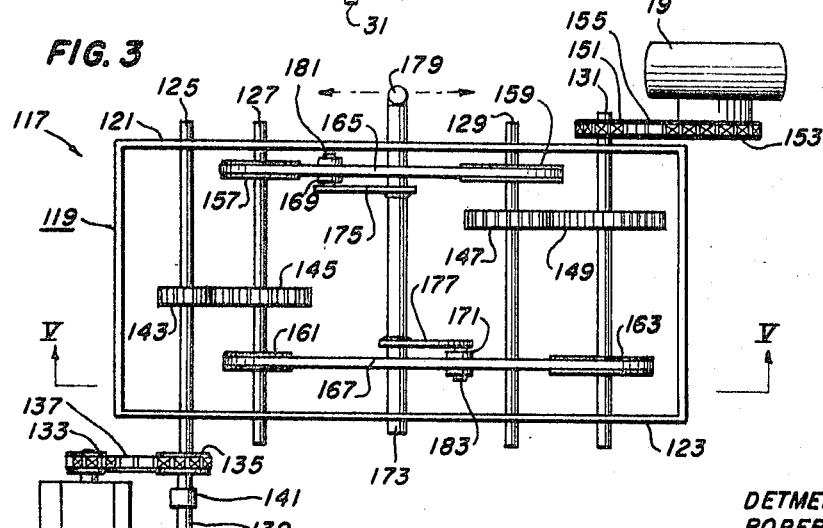
INVENTORS
DETMER B. SHAFFER
ROBERT C. DURST
BY *John R. Walker, III*
Attorney United States Patent Office  3,456,848
Patented July 22, 1969

3,456,848
WASHING AND WAXING CART FOR VEHICLES
Detmer B. Shaffer, Chesterland, Ohio, and Robert C. Durst, Boaz, Ala. (both of P.O. Box 68, Earle, Ark. 72301)
Filed May 14, 1968, Ser. No. 729,110
Int. Cl. B67d 5/60; B60s 3/06; B60k 17/00
U.S. Cl. 222—132                                5 Claims

ABSTRACT OF THE DISCLOSURE

A low-slung self-propelled washing and waxing cart having water storage tank means and pressure pump means for spray-washing automobile vehicles. The washing and waxing cart including a low operator's platform and steering and drive control means proximal to the platform. The cart being adapted to be directed to a desired spot by the operator standing on the platform and manipulating the steering and driving components with his hands. The cart being particularly adapted for use in washing and waxing automobiles parked in a row or for servicing fleet or utility vehicles or vehicles on display as for instance, in a new or used car dealer lot.

BACKGROUND OF THE INVENTION

Field of the invention

Mobile apparatus for washing, waxing, degreasing and servicing vehicles particularly automobile vehicles.

Description of the prior art

Heretofore, the general practice in washing and waxing a fleet or a large number of parked vehicles has been to drive each vehicle to the wash rack or the like, wash the vehicle and then return it back to its original parked position. Such a procedure was tedious and time-consuming and a particular washing operation may employ two or more workers for this job. Another problem experienced in the above-described procedure, and a problem particularly present in car lots having a gravel or dirt ground surafce, was that the tires of a newly washed vehicle as it was being returned to its original place collected dirt and mud on the tires of the vehicle. The muddy tires detracted from the wash job and often necessitated a second clean-up job to clean such mud or gravel from the tires. Also, as the driver of the vehicle got into and out of the vehicle in transferring it from the wash rack to the parking lot he often tracked mud or gravel on the front floor and control pedals of the vehicle. This also necessitated a second clean-up job to remove such mud and gravel material from the floors and control pedals.

SUMMARY OF THE INVENTION

A principal object of the present invention is to provide a substantially small, low-slung, self-contained, self-powered cart having pressure pump spray means and control means whereby the operator of the cart may operate the cart while standing on the platform of the cart. The apparatus is adapted to be moved between or around rows of vehicles and also between the vehicles in a row. A single worker can operate the vehicle and also manipulate the car-washing spray nozzle. Washing a series of vehicles in the above-described manner is faster than the prior procedure above described. Moreover, washing and waxing the vehicles as they stand in a parked disposition, eliminates the need for a second clean-up of tires, control pedals, floors and such as mentioned above. The cart of the present invention also includes a mechanically simple but effective drive and clutch means for driving the cart forward and rearward or for placing it in a neutral stopped disposition with the engine running.

BRIEF DESCRIPTION OF THE DRAWING

FIG. 1 is a side elevational view of the washing and waxing cart of the present invention.
FIG. 2 is a top plan view of the cart taken as from FIG. 1.
FIG. 3 is a schematic showing of the drive means of the cart.

DESCRIPTION OF THE PREFERRED EMBODIMENT

Figure 4:
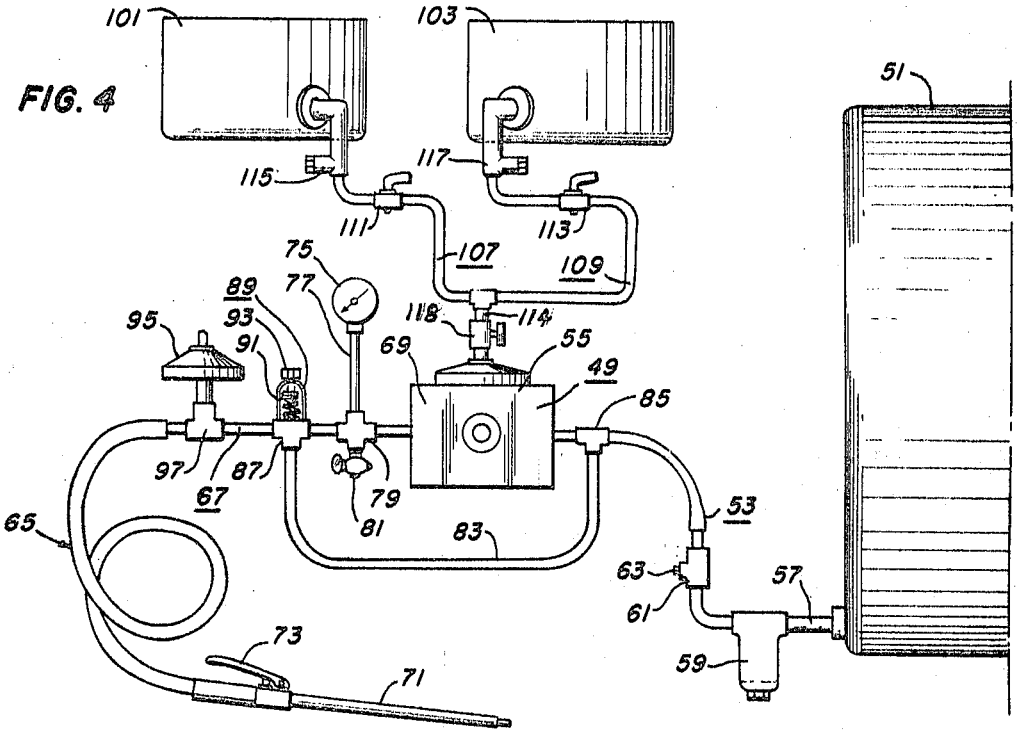
FIG. 4 is a schematic showing of the washing and waxing components of the cart.

Referring now to the drawings, the washing and waxing cart of the present invention is indicated by numeral 11 and includes a chassis 13 including a frame 15, forward and rearward wheels 17, 19 and a platform 21. Frame 15 is generally rectangular and includes left and right side members 23 and front and rear cross members 25. Oppositely projecting paired cantilever portions 27 each fixed on and projecting from a respective frame side member 23 support wheels 17, 19. Automotive type steering knuckle means 29 pivotally mount respectively each front wheel 17 from front cantilever portions 27. Stub axles 31 projecting coaxially respectively from rear cantilever portions 27 freely journal rear wheels 19. The steering means of the apparatus also includes a column 33, a steering tiller 35, and linking rods 37, 39. Steering tiller 35 is generally L-shaped and freely fitted in column 33; the operator of the apparatus, by grasping tiller handgrip 41, pivotally moves the tiller about the vertical axis of column 33. Link rod 37 communicates motion from tiller 35 to right front wheel 17 through arm means 43, 45 fixed respectively on tiller 35 and the steering knuckle of right front wheel 17. Tie rod arms 47 fixed respectively on left and right wheel knuckles in combination with link rod 39 provides tie rod means for operatively pivotally connecting the front wheels.

Platform 21 is generally square and is superjacently fixed on the rearward end portion of frame 15. A positive displacement type liquid pump 49 is securely mounted by suitable means over platform 21. A substantially large cylindrical tank 51 is lengthwise mounted on the forward portion of frame 15 preferably with opposite side portions of the tank restingly engaging side members 23 of frame 15.

First conduit means indicated 53 (FIG. 4) communicates the interior of tank 51 with the intake side 55 of pump 49. First conduit means 53 includes, progressively in the direction of flow, a stub pipe 57 communicating with the lower interior level of tank 51, a strainer 59, and a pipe T 61 fitted with a plug 63. The apparatus includes flexible hose means 65 and second conduit means 67 interconnecting the inlet of hose means 65 with discharge side 69 of pump 49. Hose means 65 includes a valved nozzle 71 including a hand operable lever 73 for stopping and controlling the flow of liquid through the hose means. A pressure gauge 75 supported on tubular stem 77 is interposedly fitted in second conduit means 67 by crossshaped fitting 79. A bleed valve 81 is fitted in cross 79 for bleeding air from the system.

A generally U-shaped bypass conduit 83 communicates respectively the interiors of first and second conduit means 53, 67; T-fittings 85, 87 at the respective ends of conduit 83 are fitted respectively in first and second conduits 53, 67. Unloader valve means 89 including a spring 91 and adjustment screw 93 is operatively mounted in fitting 87. Unloader valve means 89 is adapted to open and allow continuous circulation of liquid through pump 49 and bypass conduit 83 when the liquid pressure in second conduit 67 raises to a certain pressure. Turnably manipulating screw 93 adjusts the maximum pressure in conduit 67 and hose means 65; when the valve in nozzle 71 is closed, the unloader valve will open, allowing the liquid to recirculate through the bypass and pump means of the apparatus. A pulsator 95, well-known to those working in the art, is interposedly fitted in second conduit means 67 by T-fitting 97. Pulsator 95 causes a more efficient flow through second conduit 67 and also provides for more effective action of unloader valve 89. A small horsepower gasoline engine 99 is mounted on platform 21 and drives pump 49. The driving means for pump 49 will be explained in further detail in the following description.

Means for metering a small amount of liquid wax and detergent into the intake side of the pump is provided and includes a pair of substantially small tanks 101, 103. A generally H-shaped support 105 mounted on platform 21 supports respectively tanks 101, 103 at an elevation above pump 49. Detergent tank 101 communicates with the intake side of pump 49 through conduit means 107; liquid wax tank 103 communicates with the intake side of pump 49 through conduit means 109. Hand valves 111, 113 interposedly fitted respectively in conduits 107, 109 regulate respectively the flow of liquid from tanks 101, 103. Conduits 107, 109 preferably have a common portion 114. Strainers 115, 117 are preferably fitted respectively in conduits 107, 109 for straining foreign material from the liquid flowing respectively through the conduits. Turnable manipulating valve 118, which is interposed in portion 114, regulates the amount of detergent and liquid wax entering pump 49 and regulates the composition of the working liquid ejecting from nozzle 71.

Engine 99, in addition to providing power means for the washing and waxing components of the apparatus, also provides drive means for propelling the cart along the ground. The drive means, indicated 117, is best illustrated schematically in FIG. 3. Substantially the entire structure of drive means 117 is enclosed in a box-like housing 119 mounted longitudinally on the left portion of platform 21. Housing 119 includes a pair of vertical side plates 121, 123 parallel spaced apart and mounted securely on platform 21. First, second, third, and fourth shafts 125, 127, 129, 131 are horizontally journalled respectively between plates 121, 123 in housing 119; suitable bearings (not shown) journal shafts 125, 127, 129, 131 in parallel spaced arrangement. Chain and sprocket means including drive and driven sprockets 133, 135 and chain 137 drivingly connect first shaft 125 and engine 99. Chain and sprocket means 133, 135, 137, in addition to driving the cart propelling means, also provides drive means for pump 49. A short shaft 139 and coupling 141 preferably drivingly couple pump 49 to shaft 125.

A pair of engaged spur gears 143, 145 mounted respectively on first and second shafts 125, 127 drivingly connect the first and second shafts together. Another pair of spur gears 147, 149 mounted respectively on third and fourth shafts 129, 131 drivingly connect the third and fourth shafts together. Second chain and sprocket means including drive and driven sprockets 151, 153 and chain 155 drivingly connect fourth shaft 131 with left rear wheel 19.

Transmission means including gear change and clutch means are arranged in housing 119: A first pair of aligned pulleys 157, 159 are fixed respectively on second and third shafts 127, 129. A second pair of aligned pulleys 161, 163, are fixedly secured respectively on second and fourth shafts 127, 131. A first belt 165 is trained around and loosely engages first pair of pulleys 157, 159. A second belt 167 is trained around and loosely engages respectively pair of pulleys 161, 163. First and second idler pulleys 169, 171 are adapted to pivotally tangentially engage respectively belts 165, 167.

Figure 5:
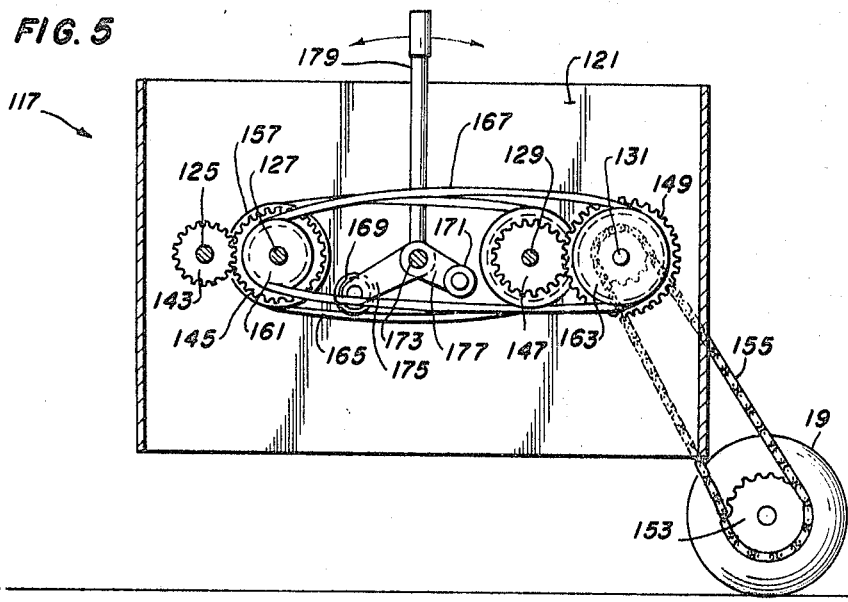
FIG. 5 is a vertical plane sectional view taken as on the line V—V of FIG. 3.

Manually operative control means is provided for selectively causing both idler pulleys 169, 171 to be simultaneously positioned away from respective belts 165, 167 or for moving one or the other of the pulleys 169, 171 into engagement respectively with belts 165, 167. The control means includes basically a shaft 173, arms 165, 177 fixedly secured respectively on shaft 173 and a hand lever 179 fixed on the shaft. Arms 175, 177 are axially spaced apart and extend radially from opposite sides of shaft 173. Pins 181, 183 fixed respectively on the distal end portions of arms 175, 177 journal respectively idler pulleys 169, 171: Considering that second shaft 127 turns in a rearward or counterclockwise direction, pulling rearwardly on hand lever 179 causes idler pulley 169 to engage belt 165, thus tightening the belt and moving the cart in a forward direction. Conversely, pushing hand lever 179 forwardly moves idler pulley 171 into engagement with belt 167 and tightens the belt, thus moving the cart in a rearward direction. When hand lever 179 is arranged vertically as illustrated in FIGS. 3 and 5, the transmission means is in neutral and the power from engine 99 is directed to pump 49. A rearwardly projecting bracket 185 is fixed on rearward upright standard 187 of support means 105. Bracket 185 provides support means for hanging coiled flexible hose means 65 when the hose is not being used and the cart is in transit.

Now, while we have shown and described an exemplary embodiment of the present invention, it will be understood that various modifications and arrangements of components and elements of structure may be made without departing from the scope of the invention.

We claim:

1. A cart for washing vehicles, especially automobiles, comprising chassis means including a frame, small ground-running wheels supporting said frame, a low platform secured on the rearward end of said frame and steering means coupled to at least some of said wheels for the steering of said cart; a liquid pump; a large tank adapted to contain water; means mounting said tank on said frame at the forward end portion of said frame; first conduit means communicating the interior of said tank with the intake side of said pump; means for metering a small amount of detergent into the intake side of said pump; flexible hose means having a valved outlet nozzle; second conduit means interconnecting the inlet of said hose means with the discharge side of said pump; bypass conduit means communicating the interiors of said first and second conduit means; unloader valve means operatively interposed in said bypass conduit adapted to open and allow continuous circulation of liquid through said pump and said bypass conduit when the liquid pressure in said second conduit means reaches a certain pressure; motor means mounted on said chassis means; first drive means drivingly connecting said motor means and said pump; and second drive means selectively communicating motion from said motor means to at least one wheel of said chassis and including clutch means for operatively disconnecting said motor means and said wheel and including forward and reverse means for optionally rotating said wheel bidirectionally and for causing said cart to move in a forward or a reverse direction.

2. The cart of claim 1 which includes means for metering a small amount of liquid wax into the intake side of said pump.

3. The cart of claim 1 in which said second drive means includes first, second, third and fourth parallel drive shafts; chain and sprocket means drivingly connecting said first shaft and said motor; first spur gear means drivingly connecting said first and second shafts; second spur gear means drivingly connecting said third and fourth shafts; second chain and sprocket means drivingly connecting said fourth shaft ad said wheel; and transmission means including a first pair of radially aligned pulleys with each pulley being fixed on a respective shaft of said second and third shafts, a second pair of radially aligned pulleys with each pulley being fixed on a respective shaft of said second and fourth shafts, a first belt trained around and loosely engaging said first pair of pulleys, a second belt trained around and loosely engaging said second pair of pulleys, a first idler pulley adapted to rollingly tangentially engage said first belt for tightening said belt, a second idler pulley adapted to rollingly tangentially engage said second belt for tightening said belt, and selectively operable control means common to said first and second idler pulleys for causing both pulleys to simultaneously be positioned generally away from respectively said first and second belts or for moving one or the other of said first and second pulleys into engagement respectively with said first or second belt.

4. The cart of claim 1 wherein said platform is unobstructed thereabove whereby an operator can stand thereona nd easily mount and dismount therefrom and wherein said tank is elongated horizontally and is low in height whereby the operator can see over said tank in maneuvering said cart among vehicles.

5. The cart of claim 4 in which said cart is smaller than the vehicles to be washed.

References Cited

UNITED STATES PATENTS

| | | | |
|---|---|---|---|
| 2,903,189 | 9/1959 | Patton | 222—178 |
| 3,003,574 | 10/1961 | Strunk | 180—70 |
| 3,232,490 | 2/1966 | McClure | 222—178 |
| 3,317,142 | 4/1967 | Casale | 239—172 X |

ROBERT B. REEVES, Primary Examiner

H. S. LANE, Assistant Examiner

U.S. Cl. X.R.

74—220; 180—70; 222—178, 318; 239—172